(No Model.) 3 Sheets—Sheet 1.
F. D. OWEN.
VELOCIPEDE.
No. 365,091. Patented June 21, 1887.
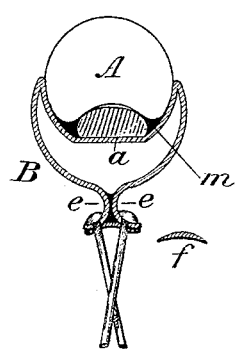
Fig. 1.
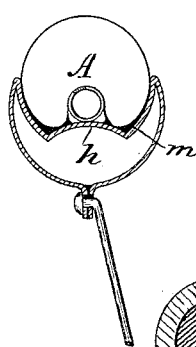
Fig. 2.
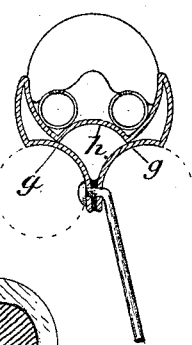
Fig. 3.
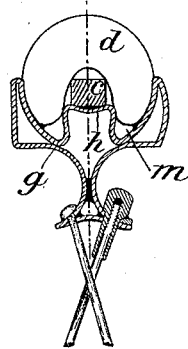
Fig. 4.
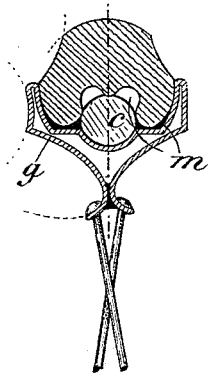
Fig. 5.
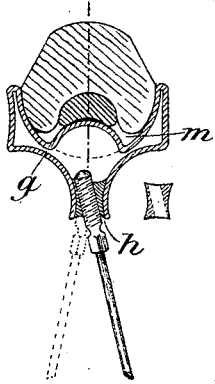
Fig. 6.
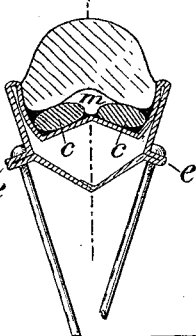
Fig. 7.
Fig. 8.
Fig. 13.
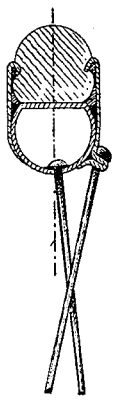
Fig. 9.
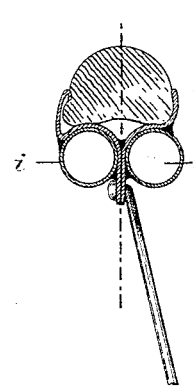
Fig. 10.
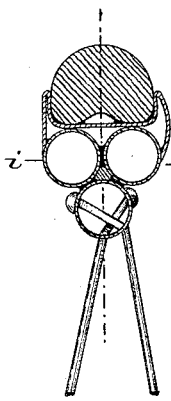
Fig. 11.
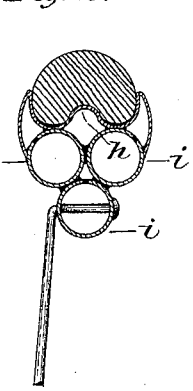
Fig. 12.
Witnesses:
S. P. Hollingsworth
W. R. Kennedy
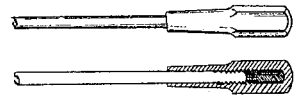
Fig. 14.
Inventor:
F. D. Owen
By P. T. Dodge
Atty.
N. PETERS, Photo-Lithographer, Washington, D. C.

(No Model.) 3 Sheets—Sheet 2.

F. D. OWEN.
VELOCIPEDE.

No. 365,091. Patented June 21, 1887.

Witnesses:

Inventor.
F. D. Owen
By P. T. Dodge
Atty (No Model.)

3 Sheets—Sheet 3.

F. D. OWEN.
VELOCIPEDE.

No. 365,091.    Patented June 21, 1887.

Witnesses,

Inventor,
F. D. Owen
By P. T. Dodge
atty

UNITED STATES PATENT OFFICE.

FREDERICK D. OWEN, OF WASHINGTON, DISTRICT OF COLUMBIA.

VELOCIPEDE.

SPECIFICATION forming part of Letters Patent No. 365,091, dated June 21, 1887.

Application filed July 26, 1886. Serial No. 209,126. (No model.)

*To all whom it may concern:*

Be it known that I, FREDERICK D. OWEN, of Washington, in the District of Columbia, have invented certain Improvements in Bicycles, Tricycles, &c., of which the following is a specification.

This invention has reference more particularly to that class of machines which are designed for racing purposes, and which for this reason must combine a maximum of strength with a minimum of weight.

The invention relates to an improvement in the sectional form of the elastic tire, whereby it is diminished in weight and given increased elasticity; to the construction of the tire of two layers of elastic material, one of which is removable independently of the other, so that the outer or wearing surface may be replaced without renewing the inner portion; to an improvement in the sectional form of the hollow rim or felly, whereby it is given great strength in proportion to its weight and adapted to permit the attachment and removal of the spokes without the removal of the rubber tire; to an improvement in the means for securing the spokes in position and to a pedal adapted for a horizontal oscillation, whereby it is enabled to conform to the changing position of the rider's foot.

Figure 15:
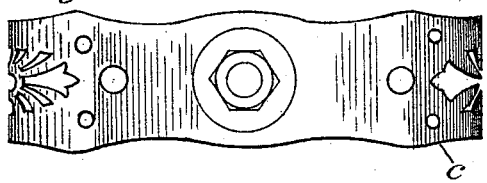
Figure 18:
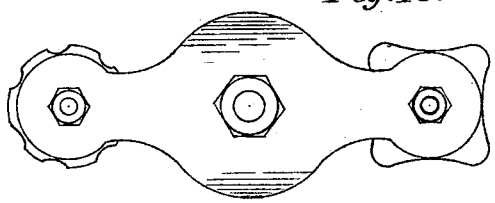
Figure 16:
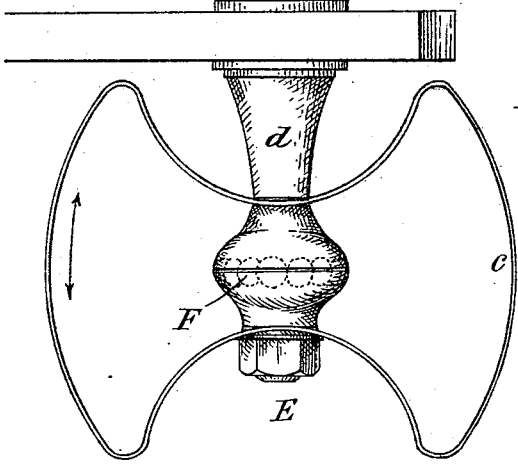
Figure 19:
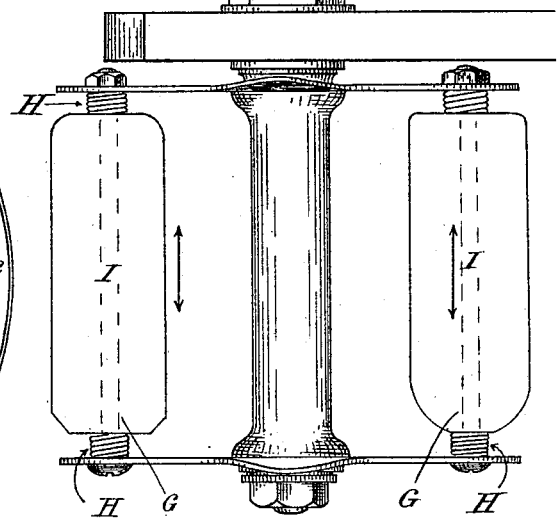
Figure 17:
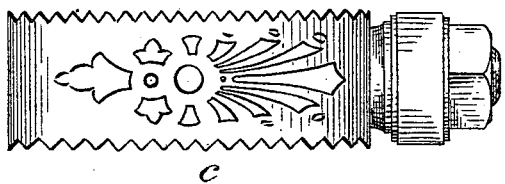
Figure 20:
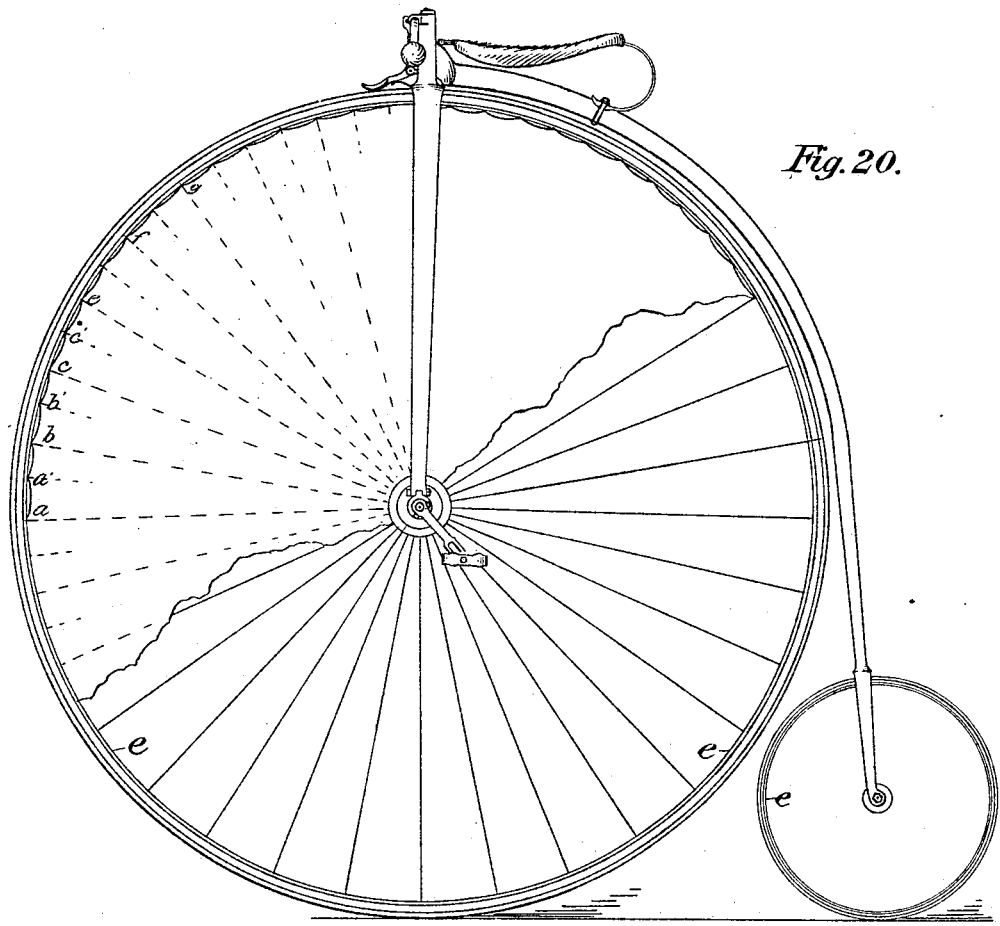
Figure 21:
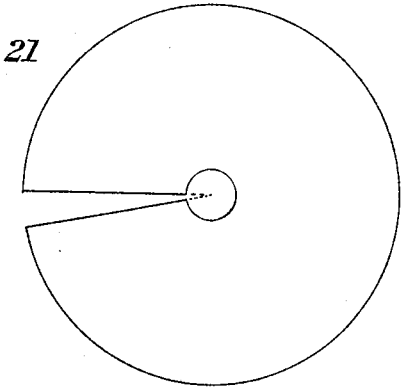
Figure 22:
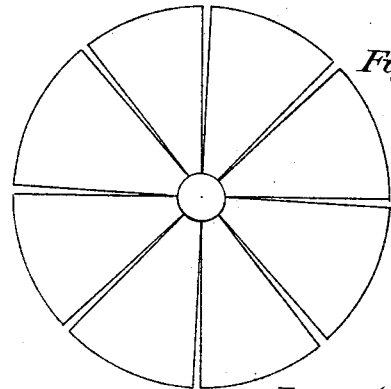

In the accompanying drawings, Figures 1 to 12, inclusive, are cross-sections showing my rim and tire in their various forms. Fig. 13 is a view showing a side elevation and an end view of one of the spokes. Fig. 14 represents in side elevation and in longitudinal section one end of a spoke and the closed nut by which it may be connected to the rim or the hub. Figs. 15, 16, and 17 are respectively an end view, a top plan view, and a side view of my pedal in its approved form. Figs. 18 and 19 are respectively an end elevation and a top plan view showing the pedal in a modified form. Fig. 20 is a side elevation of a bicycle having my improvements embodied therein. Figs. 21 and 22 are views showing the manner in which the wheel-coverings are formed.

The first part of my invention has reference to the elastic rubber tire A, which is seated, as usual, in a peripheral groove in a metallic rim or felly, B. Heretofore these elastic tires have been constructed of a circular form of solid rubber, or with a convex outer surface and a flat base, or of a circular form with an air space or chamber longitudinally through the interior.

My improvement in this regard consists in constructing the tire with a longitudinal groove or recess in its inner surface or base and combining the same with the arm in such manner as to leave a body of confined air between the two. The form of this groove may be modified to suit the form of the rim with which it is used or to meet other special requirements, the invention embracing any and all tires which have in cross-section a grooved or concave form on the inside. This concavity of the inner surface is also advantageous in that it reduces the amount of rubber required in the formation of the tire and thus lessens the expense.

In Figs. 1, 2, and 3 the tire is shown with an inner groove or depression, *a*, having a constant curve from one end to the other. In Fig. 4 the groove or channel is more abrupt, sinking suddenly into the tire at its two edges. In Fig. 5 the groove is in cross section, an irregular curve forming, in effect, two grooves or channels side by side. In Fig. 7 the groove or channel is enlarged in cross-section from the base of the tire toward the interior. In Fig. 8 it is of substantially a form in cross-section.

Tires having concave inner surfaces, in accordance with my invention, may be made of a single homogeneous body of rubber, or of two or more layers of rubber, as preferred, and they may be used in connection with rims having the receiving grooves or channels of any appropriate form in cross-section.

As commonly constructed rubber tires are made either of a homogeneous body of rubber, or of two layers of rubber, inseparably united by vulcanization or otherwise, so that when the outer wearing-surface of the tire becomes unfit for use it is customary and necessary to discard the whole tire, which results in a very considerable loss to the purchaser. To avoid, as far as possible, this loss, I provide a tire consisting of two independent or separable layers or thicknesses—an inner layer of soft elastic rubber, and an outer layer, preferably of harder rubber, best adapted to resist the wear. This outer layer, seated upon the inner portion, will be given an elastic support thereby. The inner layer, being protected from wear, is practically indestructible, and may be used for an indefinite period of time. I prefer to cement or otherwise secure the inner portion permanently in position in the rim of the wheel; but it may be laid loosely in place and confined by the outer layer secured thereover; or it may be united to the outer layer by a soluble or other cement, which will admit of the two being conveniently separated when the outer part is to be renewed. As various cements adapted for this purpose are known to every person skilled in the art, it is deemed unnecessary to give a specific formula herein. The inner and softer portion may be of any appropriate form in cross section, and may be of one or more pieces, each extending throughout the entire length of the tire.

In Figs. 1, 4, 5, and 6 $e$ represents a single body or section of soft rubber extending longitudinally and centrally along the base of the outer and harder portion, $b$. In Figs. 3 and 7 the soft inner portion is made in two parts, $c$, confined in opposite sides of the outer portion, as shown, their form being such as to leave the central groove or cavity in the tire, as before explained. Hollow or tubular rims grooved or channeled in the outer side to receive a rubber tire are now known in the art in a variety of forms; but in practice the known forms are objectionable on account of their want of strength and durability, and because they do not permit the convenient attachment and removal of the spokes without removing the rubber tire. To avoid this difficulty I form a tubular rim of sheet metal, the sheet being bent or curved in cross-section in such manner as to present on the inside of the rim a flange or flanges through which the ends of the spokes may be passed from the exterior.

In Fig. 1 the rim is formed of a single sheet of metal curved or bent longitudinally so that it presents in cross-section a hollow rim of substantially a crescent form, the two edges of the sheet being brought together at the inner face of the tire and curved outward away from each other, as shown at $e\ e$, instead of being lapped and brazed one upon the other, as usual. These outwardly-turned edges or flanges are brazed or otherwise firmly united. If desired, a connecting strip or plate, $f$, may be brazed to their inner edges, as shown, but this strip is not to be considered a necessary feature of the construction.

In Fig. 2 the rim is similar to that in the preceding figure, except that the edges of the sheet are made of flat form and brazed together, forming jointly a straight flange extending inward from the inner periphery of the tire. In Fig. 3 the edges of the rim, brought together as before to form a projecting flange, are curved upward or outward in cross-section, as shown at $g$, in order to bear against and serve as a support for the peripheral portion in which the tire is seated.

In Fig. 4 the rim combines the peculiar curved flanges of Fig. 1 with the bearing for the peripheral portion, as in Fig. 3. Fig. 5 has the edges turned outward to form flanges, as in Figs. 1 and 4, but the body of the rim is of a more angular form in cross-section.

In Fig. 6 the construction differs from that in Fig. 4, principally in the fact that a ring or strip, H, is inserted and brazed tightly between the inwardly-turned lips or flanges to serve as a bearing for the spokes or spoke retaining nuts.

In Fig. 7 the flanges $e\ e$, to receive the spokes, are formed by doubling the metal outward at the sides of the rim instead of at the center. In this case the two edges of the rim are lapped or welded at the center, as usual.

In Fig. 8 the rim is of approximately the same form as in Fig. 7, the principal difference being that the inner face is of flat instead of angular form and the lap is jointed at one edge.

It will be observed that in each of the forms described above the rim is hollow, and that the metal of which it is composed is bent in cross-section in such manner as to form one or more external spoke-receiving flanges. These flanges will of course be made continuous throughout the length of the rim. They serve not only as a convenient means by which to connect the ends of the spokes, but they also add to the strength and stiffness of the rim, giving it greater powers of resistance to those lateral strains by which the buckling of the ordinary wheels is so frequently caused.

Figs. 2, 3, 4, 6, 8, and 12 show the metal at $h$, which forms the outer face of the rim, of an outwardly curved or arched form, giving the groove or channel a gradually-diminishing depth from its sides to its middle. In Fig. 4 the central portion, $h$, is raised abruptly, producing an angular longitudinal rib in the middle of the groove or channel. In Fig. 3 the metal is raised in circular form in the middle of the channel. Fig. 8 shows still another modification in form, presenting, like the others, a channel deepest at its sides. This elevation of the tire at the middle affords increased surface to receive the cement, gives to the tire greater stiffness as against lateral strains, and permits the practical use of a tire having a body of less size than usual.

The spokes may be attached to my improved rim by providing them with heads at their outer ends and passing them through perforations in the inner flange, as shown in the several figures, or by passing them into nuts seated in the flange, as shown in Figs. 4, 6, and 8.

In order to impart to the rim additional strength and rigidity, I may combine therewith or incorporate therein one or more longitudinal tubes, $i$, as shown in Figs. 9, 10, 11, and 12. In Fig. 9 a single tube is seated within the base of the rim. In Fig. 10 two tubes are applied under and brazed firmly to opposite sides of a rim having in other respects approximately the form represented in Fig. 6. In Figs. 11 and 12 three tubes are applied, one under each side and one in the body portion of the rim.

Another feature of my invention consists in so forming and placing the tire that a continuous air space or channel is formed between its inner face and its supporting-rim, the body of air confined in this channel serving as a cushion to support the tire and give increased elasticity, and also permitting the tire to change its form under the pressure to which it is subjected when in use.

In Fig. 1 two air-spaces, $m$, are shown under opposite edges of the tire, which is formed with longitudinal grooves. In Fig 4 the two air-channels underlie the edges of the tire outside of the raised central portion, $h$, of the rim. In Fig. 5 the air-channel $m$, underlies the edges of the tire and also the central portion of the tire-body above the inner and softer portion, $c$. In Fig. 6 the air-spaces underlie the edges of the tire only. In Figs. 7, 8, 10, and 11 the air-channel is located centrally of the tire.

I do not claim a hollow or tubular tire—that is to say, a tire having a longitudinal air-chamber inclosed therein—my invention in this regard consisting in the formation of the tire and rim in such manner that the air is confined between the inner surface of the tire and the outer surface of the rim.

I am aware that tires are commonly provided with a series of fine grooves or serrations in their inner surface, as in the well-known Hancock tire, for the purpose of affording an increased surface for the action of the cement by which the tire is retained in place; but in no instance, to my knowledge, has a tire been provided with a deep groove or channel and combined with a rim in such manner as to leave a confined body of air between the two as a cushion or support for the tire.

Passing next to my improvement in the construction of the pedal, attention is directed to Figs. 15 to 19. Pedals are commonly mounted to revolve upon horizontal pins or journals extending from the cranks of the machine, the construction being such that although the pedal may revolve freely in a vertical plane it is prevented from rotating or vibrating horizontally. By observation I have discovered that the foot of the rider has a natural tendency to turn horizontally to a limited extent during its rising and falling movement, and to provide for this movement I connect the body of my pedal or the pedal proper with the crank-pin in any manner which will admit of a horizontal rotary or oscillatory movement.

In Fig. 15, $c$ represents the foot-piece or pedal proper, consisting simply of a continuous band of steel bent into the form shown, or equivalent form, and secured at its middle to the ordinary sleeve or support, $d$, which receives the crank-pin E. By reason of its form and flexibility the pedal $c$ affords a firm support for the foot of the rider, but by reason of its flexibility it will admit of the foot rocking horizontally to the required extent without appreciable resistance. In order to secure the best results, I recommend the employment between the sleeve and crank-pin of a single row of anti-friction balls, F, located directly beneath the center of the pedal—that is to say, midway of its width.

In Figs. 18 and 19 the pedal-frame is constructed in the ordinary form and mounted on a crank-pin in the ordinary manner, but the foot-piece or the rubbers I, which receive the pressure of the foot, instead of being mounted immovably in the frame, as usual, are arranged to slide longitudinally on the horizontal supporting-bolts G, and are retained normally in a central position by spiral springs H, seared against their ends. These springs permit the foot-piece to play endwise in such manner that the foot may oscillate horizontally.

I am aware that a pedal has been arranged to slide horizontally on its crank-pin, and sustained by a spring so that it could yield in the event of the machine falling upon its side, and this I do not claim, my invention being limited to a pedal mounted in such manner that it may turn or oscillate horizontally to follow the lateral turning motion of the foot during the pedaling action.

In bicycles and tricycles as commonly constructed the soft-rubber tire seated in the grooved rim projects beyond the same in a semicircular or approximately semicircular form. As a result of this construction, it is found in rolling over the ground under pressure the tire is expanded laterally, so that it projects beyond the edges of the rim and is sheared or cut off thereby. To avoid this difficulty I reduce the width of the tire outside of the rim or felly, making its size either of a flat or concave form, or of other form falling within the semicircle, so that when subjected to pressure the lateral expansion or enlargement will not cause the tire to project beyond the rim. This construction is plainly shown in Figs. 5, 6, and 7.

I do not claim a rubber tire having an inclosed air-space therein, nor a solid tire having flanges rolled on its sides, nor a tire the outer periphery of which is formed with a longitudinal groove in the middle, nor a tire composed of two layers of material inseparably united in the process of vulcanization, being aware that these features are in themselves old.

Having thus described my invention, what I claim is—

1. A rubber tire consisting of an inner layer of soft elastic rubber and an outer layer of tough refractory rubber seated thereon and adapted for removal at will therefrom, whereby the wearing-surface is given an elastic support and rendered renewable without renewing the inner body.

2. In a wheel, the combination of a grooved metallic rim, a layer of soft elastic rubber applied in said groove, and an outer layer of harder and more refractory rubber also seated in said groove and secured independently of the inner layer, whereby the removal of the outer layer or wearing portion is permitted independently of the remaining portion.

3. In a wheel, the combination of a grooved or channeled rim, a rubber-tire section seated in the bottom of the groove, and a second rubber-tire section seated in the groove on top of the other section and projecting beyond the rim, this outer section being adapted, as described, for removal independently of the inner section, whereby wear of the outer wearing-surface of the tire may be removed and a new surface applied without loss of the inner body by which it is sustained.

4. A hollow grooved rim consisting of a metal sheet bent into tubular form, its two edges being returned to the inner face of the rim, united and turned apart to form spoke-receiving flanges.

5. The hollow metallic rim for a wheel, consisting of a seamless tube indented in the outer side to form the tire-receiving channel, its outer side walls being substantially vertical, and its inner sides bent inward to meet and sustain the tire-receiving portion between the sides and the middle, as shown at $g$.

6. In combination with the rim having an external flange, a spoke extending at one end through said flange and provided with a head flattened on one edge and arranged to bear against the face of the rim to prevent its rotation.

7. In a pedal for bicycles and similar vehicles, a pedal consisting of a sleeve or bearing, and a foot piece or pedal proper mounted thereon and adapted, as described, to oscillate in a horizontal plane, whereby it is adapted to adjust itself to the lateral play of the rider's foot.

8. In a bicycle-pedal, the combination of the sleeve or bearing and the flexible sheet-metal foot-piece secured thereto, substantially as described.

9. A hollow metallic rim for a wheel, consisting of a body portion having a spoke-receiving channel, and one or more tubes, $l$, secured rigidly and externally to the body portion of the rim for the purpose of supporting and stiffening the same, substantially as described.

10. In a bicycle or similar machine, an operating-pedal adapted to turn horizontally on its support to follow the changing positions of the foot.

11. In a bicycle or like machine, the combination of a pedal, a crank-pin or wrist to sustain the same, and a single row of intermediate balls located midway of the width of the pedal, as described and shown, whereby the balls are brought directly under the middle of the operator's foot.

In testimony whereof I hereunto set my hand, this 22d day of June, 1886, in the presence of two attesting witnesses.

FREDERICK D. OWEN.

Witnesses:
SIDNEY P. HOLLINGSWORTH,
ANDREW PARKER.